May 23, 1961  E. LEISS  2,985,459
RELEASABLE WORK HOLDING DEVICE
Filed March 12, 1959
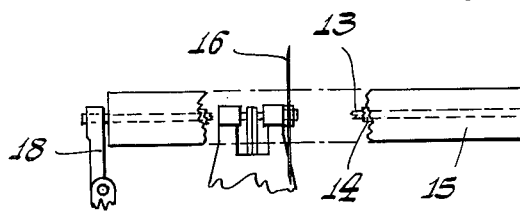
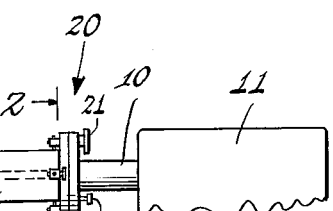
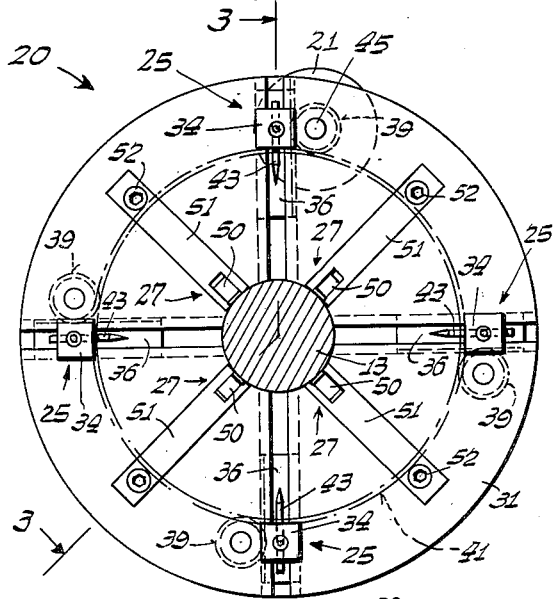
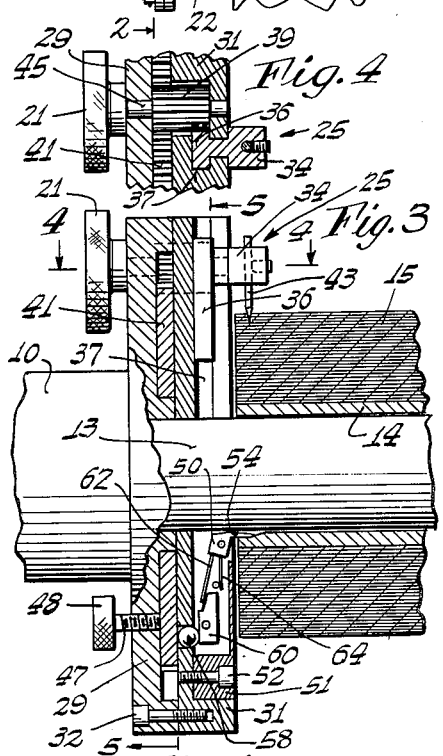
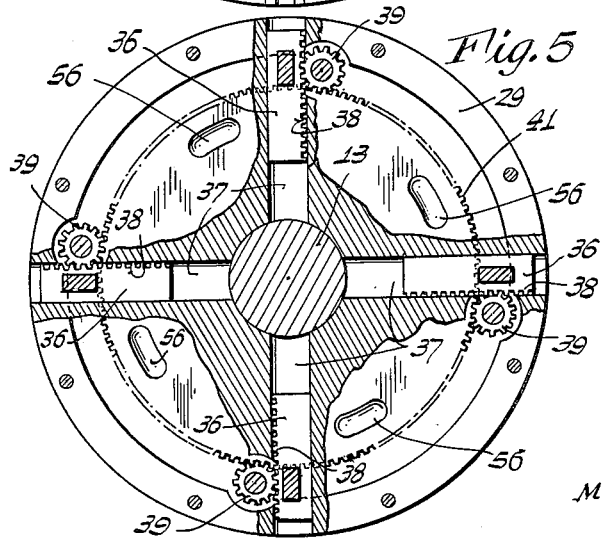
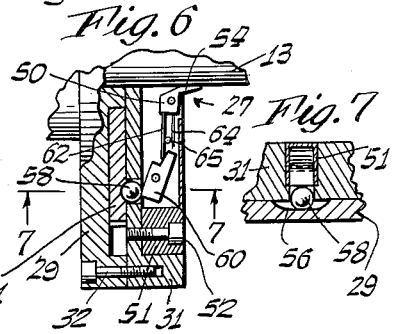
INVENTOR.
Emil Leiss
BY
Munn, Liddy, Daniels & March
ATTORNEYS

United States Patent Office 2,985,459
Patented May 23, 1961

2,985,459
RELEASABLE WORK HOLDING DEVICE
Emil Leiss, Ridgewood, N.J., assignor to Lever Bias Machine Corporation, New York, N.Y., a corporation of New York
Filed Mar. 12, 1959, Ser. No. 799,021
16 Claims. (Cl. 279—110)

This invention relates to releasable work holding devices, and more particularly to rotary work holding devices or chucks of the type intended to be used on power-driven spindles, to releasably grip rolls of work or the like.

An object of the invention is to provide a novel and improved releasable work-holding chuck of the type arranged to grip and drive a turnable workpiece or roll of work, wherein the work-engaging jaws may be easily and quickly actuated and adjusted to engage the work without involving the use of special tools or other like instruments.

A further object of the invention is to provide an improved work holding or engaging chuck in the form of a rotary holder or face plate, wherein the jaw-actuating means is conveniently disposed at the rear of the holder plate and arranged to be easily and quickly operated by hand.

Another object of the invention is to provide a novel and improved releasable work-holding chuck as above characterized, which has several sets of work-engaging jaws with one set arranged to grip the outside of a roll of work and another set adapted to engage and grip the inside of the work roll.

A feature of the invention resides in the provision of a novel locking-type work-driving chuck of the above character wherein the locking means is extremely simple in its construction and yet wholly effective to securely lock the chuck in all of its various adjusted positions.

Another feature of the invention resides in the provision of an improved work-driving chuck device having multiple sets of jaws as outlined, wherein one of said sets has a relatively short or small travel and is powerfully driven by simple, positive-acting cam and anti-friction means.

Yet another object of the invention is to provide an improved chuck device having multiple sets of jaws, wherein simple, coupled driving means is employed for actuating all the jaws, said driving means effecting a positive retraction of those jaws having relatively great movement and permitting a spring-retraction of other jaws which are required to have only relatively little movement with the spring retraction thereof being unimpeded by the work.

Still another object of the invention is to provide an improved chuck of the above type, which is extremely compact in its construction and of relatively small size whereby it may be readily accommodated in power-driven equipment without requiring appreciable space.

A further object of the invention is to provide a novel and improved releasable chuck device having the above features and advantages and which is nevertheless simple to construct and economical to fabricate.

Other features and advantages will hereinafter appear.

In the drawings accompanying this specification similar characters of reference are used to designate like components throughout the several views, in which:

Fig. 1 is a fragmentary front elevational view of a powered slitting machine employing the improved chuck of the invention.

Fig. 2 is an elevational view looking at the front face of the chuck,

Fig. 3 is a section taken on the line 3—3 of Fig. 2.

Fig. 4 is a fragmentary transverse sectional view taken on the line 4—4 of Fig. 3.

Fig. 5 is a view partly in section and partly in elevation, the section being taken on the line 5—5 of Fig. 3.

Fig. 6 is a fragmentary sectional view similar to that shown in the lower portion of Fig. 3, but illustrating different positions of the parts wherein the inner set of jaws is shown as retracted.

Fig. 7 is a fragmentary sectional view, taken on the line 7—7 of Fig. 6.

Referring first to Fig. 1 there is illustrated a portion of a roll-slitting machine of the type which is used for slitting rolls of fabric and the like, said machine including a powered spindle 10 extending from a drive housing 11, the spindle 10 having a smaller-diameter shaft 13 adapted to pass through the hollow core 14 of a roll of fabric 15 which is to be supported and turned preparatory to being slit by a power-driven rotary knife 16. The shaft 13 is supported by a suitable bearing carried by a bearing bracket 18 mounted on the machine frame, thereby to effect a support for the work roll 15 at both ends thereof.

In accordance with the present invention the driving spindle 10 is provided with a novel and improved chuck device 20 which securely grips one end of the work roll 15 and reliably drives the same, said chuck device being easily operated by hand both for the purpose of gripping the work roll 15 and also releasing the latter after the slitting of the roll has been completed, all without requiring the use of tools, special wrenches or the like.

The operation of the chuck device 20 is effected by a simple turning movement imparted to an actuating knob 21 provided at the rear face or surface of the chuck, and upon the jaws of the chuck being properly set they may be readily locked in their adjusted positions by imparting a turning movement to a second, locking knob 22 also provided at the rear face or surface of the chuck.

Further, in accordance with the invention and referring to Figs. 2 and 3, the chuck device 20 is provided with several sets of jaws arranged for engagement not only with the outside of the roll of work 15 but also with the inside or core 14 normally provided therewith, thereby to insure a reliable and accurate positioning and positive drive of the work roll under all conditions of use. The outer set of jaws, which are inwardly acting, is designated generally by the numerals 25, whereas the inner set of jaws, which are outwardly acting, is designated generally by the numerals 27.

Both sets of jaws 25, 27 are carried by a rotary holder plate or face plate which may be advantageously constituted of several separate components. As shown, the rotary holder plate may comprise a disk 29 rigidly secured to the driving spindle 10, said disk being integral with the spindle where such construction is found to be feasible. The rotary holder plate may further comprise a second disk 31 which may be secured to the first disk 29 in any suitable manner, as by the use of recessed, fillister head screws 32.

The outer set of jaws 25 is seen to comprise a plurality of holder members 34, Figs. 2, 3 and 4, having an I-shaped cross-section at the body portions thereof and having elongate slide portions 36, said body members being carried in radial T-slots 37 provided in the holder plate 31. The slide portions 36 of the holder members are provided with teeth 38 along their edges for engagement with pinions 39 which are rotatably mounted on the holder plates 29, 31 so that their axes are parallel with the axes of the said plates.

Moreover, in accordance with the invention, the pinions 39 are arranged to have appreciable axial length and to additionally mesh with a large central gear 41 which is turnably carried by the holder plate 29 and is coaxial therewith; by such organization all of the jaw body members 34 are coupled for simultaneous movement, both in outward directions and also in inward directions, such movement being in response to turning of the gear 41 with respect to the holder plates 29, 31.

As seen in Figs. 2 and 3, the jaw holder members 34 may be provided with pointed pins 43, secured to the members in any suitable manner as by the set screws shown, the said pins being adapted for engagement with and imbedment in the outside layers of the work roll 15 for the purpose of imparting movement to the said roll.

By the present invention the operating knob 21 which is disposed at the back surface of the rotary holder plates 29, 31 is fixedly secured to a shaft 45 carrying one of the pinions 39, as seen in Figs. 3 and 4, thereby to enable the central large gear 41 to be readily actuated and turned, and consequently to enable the entire outer set of jaws 25 to be readily adjusted both inwardly and outwardly without requiring the use of special tools, wrenches or the like. By virtue of the relatively small diameters of the pinions 39 the actuation of the set of jaws 25 may be easily effected, in a quick and facile manner.

Further, in accordance with the invention, a novel and simplified locking means is provided to securely retain the jaws of the outer set 25 in their adjusted positions. This locking means comprises, in its simplest form as shown, a single screw 47 having a knurled finger-engageable head 48, the said screw being threaded into the rotary holder plate 29 and arranged to directly engage the central gear 41 near the outer periphery thereof. It will be readily understood that when the locking screw 47 is loose, the outer set of jaws 25 may be readily adjusted by turning the knob 21, and upon the work roll 15 being properly engaged by the pins 43 of the jaws, the said jaws may be locked in their adjusted positions by tightening the locking screw 47, thereby to lock the large central gear 41 against any further turning.

In accordance with the present invention, in conjunction with the outer set of work-engaging jaws 25 there is also provided the additional and inner set of jaws 27 which have a relatively small movement, being adapted to engage the inside of the core 14 of the work roll 15 as clearly shown in Fig. 3. The inner set of jaws 27 is advanced or moved outward by a positive drive means, said jaws however being retracted or shifted inward by spring action, thereby effecting a desirable simplification of the actuating mechanism. Moreover, the positive outward actuation of the second set of jaws 27 is effected by a simple and reliable anti-friction cam mechanism which renders the operation of the chuck easy and foolproof.

Referring to Figs. 3, 5 and 6, the jaws of the inner set 27 are seen to each comprise a lever 50 pivotally mounted in an elongate holder 51 which is secured to the rotary holder plate 31 by suitable recessed fillister head screws 52. The lever-type jaws 50 have work-engaging tapered arms 54 extending generally axially of the holder plates 29, 31, said arms being arranged to engage the inside of the core 14 of the work roll 15 as clearly shown in Fig. 3. Actuation of the levers 50 simultaneously with actuation with the outer set of jaws 25 is effected by a cam-type transmission, involving a plurality of cam surfaces 56 disposed in one side of the large central gear 41 and arranged to engage anti-friction balls 58 carried in recesses disposed in the holder plate 31, as seen in Figs. 3 and 6. The anti-friction balls 58 engage transmission levers 60 which are pivotally mounted in the holders 51, said levers engaging stiff arms 62 provided on the jaws 50 as shown. The said jaws 50 also carry leaf springs 64 engageable with fixed pins 65 secured in the holders 51, thereby to provide a counterclockwise bias to the jaws 50 as seen in Figs. 3 and 6, thus to effect retracting movement of said jaws so as to release the tubular core 14 of the work roll 15.

Operation of the inner set of jaws 27 may now be readily understood. When the central gear 41 is turned in response to actuation of the knob 21 for the purpose of actuating the outer set of jaws 25, the cam surfaces 56 on the gear 41 will effect a counterclockwise turning of the transmission levers 60 (from the position shown in Fig. 6 wherein the inner jaws are retracted to the position of Fig. 3 wherein the inner jaws have been driven clockwise to their extended, work-gripping positions). Thus, not only is the roll 15 positively engaged at the outer layers of cloth by the sharp pins 43 of the outer set of jaws 25, but also the core 14 of the roll is securely gripped by the expanding-type inner jaws 50, thereby to effect a positive and reliable drive of the work roll 15. Upon reverse turning of the actuating knob 21 the cam surfaces 56 will relieve the inner jaws 50 of their clamping forces, and the said jaws will be returned to the retracted positions of Fig. 6 by the leaf springs 65 as the outer jaws 25 are retracted or shifted outward, all in response to turning of the large gear 41.

It will be understood that the locking screw 47 effects a locking of the inner jaws 50 as well as of the outer jaws 25 by virtue of securing the central gear 41 in its adjusted position.

It will now be seen that I have provided in accordance with the present invention a novel and improved chuck construction characterized by inner and outer, positively-advanced gripping jaws, together with spring-retracted inner jaws, the latter having relatively limited movement whereas the outer jaws have a fairly extensive movement. Moreover, the actuation and locking of the jaws may be easily and quickly effected manually without requiring the use of special tools, wrenches or the like, by merely turning the actuating knob 21 at the rear plate of the holder plate, and locking the adjustment by turning of the locking screw 47 also located at the rear surface of said plate. The chuck construction is seen to be extremely compact, and constituted of relative simple mechanical movements whereby a positive and reliable operation is had at all times, in a construction which is relatively small and easily incorporated in existing machine structures. The use of the anti-friction transmission balls 58 and levers 60 provides a smooth operation of the inner jaws 50, further facilitating the use of the chuck. By virtue of the two sets of jaws, engaging not only the outer layers of the roll 15 but also the inside of the core 14 a positive drive of the roll is effected at all times.

Variations and modifications may be made within the scope of the claims, and portions of the improvements may be used without others.

I claim:

1. A chuck for use with a power-driven spindle to releasably grip a hollow roll of work, comprising a rotary holder plate having means for mounting it on said spindle; a plurality of inwardly-acting jaws movably carried by said holder plate at the front thereof for engaging the outside of a roll of work, said jaws being mounted for movement in directions toward and way from the center of the plate; jaw-driving means for effecting simultaneous inward and outward movements of said jaws; and manually engageable means including a turnable knob disposed at the rear of the holder plate, for actuating said jaw-driving means, said manually engageable means further including a pinion which is carried by the holder plate with its axis parallel to the axis of the plate and is operatively connected with the turnable knob, said jaw driving means including a gear arranged coaxially on the holder plate and engaged by the said pinion to be driven thereby, and including racks associated with the jaws, and pinions drivingly engaged with the racks and also with the said gear, one of said racks also being engaged by the pinion which is operatively connected with the turnable knob.

2. The invention as defined in claim 1, in which the jaws include holder members having body portions of I-shaped cross section, said holder members being movable in T-slots in the holder plate, and said holder members having teeth constituting the said racks.

3. The invention as defined in claim 1, in which there is means including a manually engageable member movably mounted at the rear of the holder plate, for locking the said jaw-driving means in its various adjusted positions.

4. The invention as defined in claim 3, in which the locking means comprises a threaded locking device actuatable by the locking member, for securing the gear in different adjusted positions.

5. The invention as defined in claim 4, in which the gear is carried in a recess in the holder plate, and in which the threaded locking device comprises a screw threaded in the holder plate and directly engaging the said gear.

6. A chuck for use with a power-driven spindle to releasably grip a hollow roll of work, comprising a rotary holder plate having means for mounting it on said spindle; a plurality of inwardly-acting jaws movably carried by said holder plate at the front thereof for engaging the outside of a roll of work, said jaws being mounted for movement in directions toward and away from the center of the plate; jaw-driving means for effecting simultaneous inward and outward movements of said jaws; a plurality of outwardly-acting jaws movably carried at the front of the holder plate for engagement with the inside of a roll of work, said outwardly-acting jaws being mounted for movement in directions toward and away from the center of the holder plate; and means coupled to the said jaw-driving means and responsive to movement thereof, for effecting simultaneous outward movements of the outwardly-acting jaws simultaneously with inward movements of the inwardly-acting jaws and vice versa.

7. The invention as defined in claim 6, in which the outwardly acting jaws comprise levers which are pivotally mounted on the rotary holder plate, said levers having arms extending axially of the said plate and adapted for engagement with the inside of the roll of work.

8. The invention as defined in claim 7, in which the said levers carry leaf springs biasing the levers in directions tending to shift the work-engaging arms thereof in directions toward the center of the holder plate.

9. The invention as defined in claim 6, in which the said jaw-driving means includes a gear rotatably carried by the holder plate, and in which the means for effecting simultaneous outward movements of the outwardly acting jaws include cam elements operatively associated with the said gear.

10. The invention as defined in claim 9, in which the outwardly acting jaws comprise transmission levers pivotally mounted on the holder plate, and in which the cam means includes cam followers operatively engaged with the said levers.

11. The invention as defined in claim 9, in which the said jaw-driving means comprises a gear rotatably mounted on the holder plate and coaxial therewith, and in which the cam means comprises sloping cam surfaces provided on the said gear.

12. The invention as defined in claim 11, in which the cam means includes transmission levers operatively associated with the outwardly acting jaws and arranged to be responsive to movement of the cam surfaces provided on the said gear.

13. The invention as defined in claim 9, in which the cam means includes cam surfaces associated with the said jaw-driving means, and includes anti-friction balls engaged with the said cam surfaces.

14. The invention as defined in claim 13, in which the jaw-driving means includes a gear rotatably carried by the holder plate and coaxial therewith, said gear being provided with the said cam surfaces.

15. The invention as defined in claim 6, in which there are spring means biasing the outwardly acting jaws in directions toward the center of the holder plate.

16. A chuck for use with a power-driven spindle to releasably grip a hollow roll of work, comprising a rotary holder plate having means for mounting it on said spindle; a plurality of inwardly-acting jaws movably carried by said holder plate at the front thereof for engaging the outside of a roll of work, said jaws being mounted for movement in directions toward and away from the center of the plate; jaw-driving means for effecting simultaneous inward and outward movements of said jaws; and manually engageable means including a turnable knob disposed at the rear of the holder plate, for actuating said jaw-driving means; a plurality of outwardly-acting jaws movably carried at the front of the holder plate for engagement with the inside of a roll of work, said outwardly-acting jaws being mounted for movement in directions toward and away from the center of the holder plate; and means coupled to the said jaw-driving means and responsive to movement thereof, for effecting simultaneous outward movements of the outwardly-acting jaws simultaneously with inward movements of the inwardly-acting jaws and vice versa.

References Cited in the file of this patent

UNITED STATES PATENTS

| | | |
|---|---|---|
| 1,570,724 | Beck | Jan. 26, 1926 |
| 2,703,242 | Sloan et al. | Mar. 1, 1955 |
| 2,894,757 | Schustack | July 14, 1959 |